Patented Jan. 2, 1951

2,536,113

UNITED STATES PATENT OFFICE 2,536,113

WELL DRILLING FLUIDS AND METHODS OF USE

Cary R. Wagner, Utica, Ohio, assignor to Phillips Petroleum Company, a corporation of Delaware No Drawing. Application August 15, 1947, Serial No. 768,943

18 Claims. (Cl. 252—8.5)

This invention relates to water base drilling muds containing a water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium. In some aspects it relates to drilling fluids suitable for drilling in heaving shale. In still other aspects it relates to drilling fluids having a high salt content, due either to deliberate addition of salt, or due to contamination of the mud with salt from natural formations or from connate waters. It also relates to methods of drilling or controlling wells with such fluids. It is a companion invention to my copending application Serial No. 549,299, filed August 12, 1944, now U. S. Patent 2,425,768 for "Drilling Fluids and Methods of Use."

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing loss of at least any substantial amount of water from the drilling mud to the natural formations in the well. The weight of the mud prevents blowouts of formation pressures especially when weighting agents are employed. In order to perform these important functions properly the drilling mud must have suitable viscosity and other qualities at all times in spite of adverse conditions encountered in drilling the well. Thixotropic properties of the mud support the cuttings during any time the pumps are shut down.

In drilling wells there are two major difficulties caused by natural formations penetrated. The first of these difficulties is that if salt is encountered the salt will cut ordinary drilling mud so that its viscosity is entirely too high, the clay particles are deflocculated, and there is grave danger of the drilling pipe twisting in half or gas cutting or a blowout occurring due to the salt cutting of the mud. The other difficulty encountered is that when a formation known as heaving shale is penetrated, this heaving shale absorbs water from the drilling mud and by a caving or disintegration action common to clay and shale, or by a swelling action common to bentonite materials, the well hole is closed around the drill string choking off the circulation of drilling mud and often seizing the drill string so that the drill string twists in half.

The principal object of my invention is to produce a drilling mud which can be used not only in ordinary formations but which will resist contamination by salt and which will not cause heaving shale or similar formations to cave or swell.

Another object is to provide an improved drilling mud.

A further object is to provide a drilling mud containing a water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium.

Another object is to provide a drilling mud containing such a water soluble salt of carboxyalkylcellulose and a salt.

Numerous other objects and advantages of the invention will be apparent to those skilled in the art upon reading the following specification and the accompanying claims.

OPERATION

In the present invention I prefer to employ as a colloidal suspending agent or dispersing agent in a drilling mud a water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium. The amount of these water soluble salts of carboxyalkylcelluloses employed is not critical as even small amounts give a corresponding smaller effect, from one to five pounds per barrel (42 gallons) being preferred, but as this depends on the formation being drilled much less or much more of the water soluble salts of carboxyalkylcellulose may be employed and still the advantages of my invention will be achieved to a greater or lesser extent, so that it is believed better to claim the true limits, the lower limit being that which reduces the water loss and the upper limit being that which by high gel strength, or viscosity, the mud cannot be circulated in the well by the mud pump (which mud pump is a well known element of all rotary drills).

Ammonium carboxymethylcellulose has long been known as an article of commerce, but would not seem at first to be suitable as a drilling mud additive, because C. J. Brown and A. A. Houghton in the Journal of the Society of Chemical Industry 60, 254–8 (1941) on page 255, first two lines, stated it was unstable and that it loses ammonia on heating to 50–60° C. It is an unexpected and patentable discovery, however, that in many instances ammonium carboxymethylcellulose can be used successfully in drilling mud as will be discussed below. The preparation of various carboxymethylcelluloses was described in said Brown and Houghton article, and the preparation of various carboxyalkylcelluloses was described in German Patent 332,203 of 1918. However, while carboxymethylcellulose was easily made with cellulose, water, caustic soda, and the sodium salt of monochloroacetic acid, attempts to make carboxyethylcellulose and carboxypropylcellulose in commercial quantities by the use of chloropropionic acid and homologs proved negative. It is preferred to produce the alkali metal, ammonium and alkali earth metal salts of carboxyethylcellulose valuable in drilling mud (or, as sometimes called, carboxyethycellulose ethers) from water, cellulose, caustic soda and acrylonitrile by the method set forth in the copending application of William M. Hutchinson, Serial No. 729,199, filed February 17, 1947 (now Patent No. 2,519,249 dated August 15, 1950), which produces the carboxyethylcellulose known as beta carboxyethylcellulose ether.

As reported below the alkali metal, ammonium, and alkali earth metal salts of carboxyethylcellulose were found to be valuable as predicted by the present inventor. The corresponding metal or ammonium salts of both carboxyethylcelluloses (alpha carboxyethylcellulose ether and beta carboxyethylcellulose ether) will give substantially the same treating effect in driling mud. The same salts of the five types of carboxypropylcellulose are predicted as of value, and the same for higher homologs, but they do not seem to be available in quantities sufficient to test.

The manner in which these carboxyalkylcelluloses are made is immaterial to the present invention provided a water soluble material is produced. In this respect the reaction to finally produce the water soluble material may be carried out in the mud pit, or even the well bore of the well being drilled, as carboxymethylcellulose which is an acid and is insoluble in water may be added to the drilling mud in the pit or elsewhere, and sufficient alkali, such as ammonium hydroxide, added to make the desired water soluble salt of carboxymethylcellulose. The same is true of the formation of water soluble salts of carboxyethylcellulose.

The water soluble salts of carboxyalkylcellulose may be in died powder form, the particle size not being critical. However, for rapid solution a particle size where 95% will pass an 80 mesh screen is useful. In the case of some slowly water soluble salts of carboxyalkylceluloses, or to speed up the solution of any water soluble salts of carboxyalkylceluose, any suitable wetting agent may be added first, such as alcohol, or alkaline solutions, to form a concentrated solution or paste, and then diluting said concentrated solution or paste with water and/or the drilling mud and adding the diluted mixture to the drilling mud in the mud pit or at the pump intake.

In rotary drilling the usual methods consist in adding the water soluble salts of carboxyalkylcellulose powder (which may be added to the drilling fluid flowing in the mud ditch to the pump intake; or to the mud pit) by scattering the powder over the surface of the drilling mud. An alternative method would be to make up a more or less concentrated solution of the water soluble salts of carboxyalkylcellulose and add that in a stream to the drilling mud. In some instances a pure mixture of water and water soluble salts of carboxyalkylcellulose may be used as the well drilling or well controlling fluid, but mud is generally added. The drilling fluid containing the water soluble salts of carboxyalkylcellulose and water is pumped in circulation or reverse circulation in the drill string or used to fill or partially fill the well in the usual operations of well drilling and well controlling of the prior art. When these water soluble salts of carboxyalkylcellulose are so used in sufficient amount a new result is achieved in that salt water does not cut the mud qualities enough to harm it for drilling and formations exposed to it do not cave or heave enough to stop the drilling. Suitable control or mud treating agents may be used, such as phosphates and/or quebracho if desired.

I have found that water soluble salts of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium give excellent results in water base drilling mud as stated herein, all having quite similar effects on water base mud.

Any use of a water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium to be retained as a soluble dispersing agent throughout the entire normal life of the drilling mud is not to be confused with the use of some alkali or acid soluble cellulose which is to be precipitated as an insoluble plugging agent in the formation. I do not use my water soluble salts of carboxyalkylcellulose as a plugging agent.

The mode or theory of operation by which these water soluble salts of carboxyalkylcelluloses protect the surface of clay or bentonite from attack by water is obscure, but it is believed that as the water attempts to enter the clay they form a layer of a protective material on the outside of the clay or bentonite preventing the clay or bentonite from absorbing the water from the drilling mud.

Drilling muds containing water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium are To determine additional properties of the materials being tested, water solutions containing one percent by weight of sodium, potassium, lithium, ammonium, barium, calcium, strontium and magnesium carboxyethylcellulose were prepared and the viscosity, insoluble gel content, and the pH of these solutions were determined. The insoluble gel content was determined by centrifuging 10 ml. of 1% solutions for 5 minutes and measuring the volume of gel in the bottom of the tube. The alkali metal salts of carboxyethylcellulose gave as good, if not better, water loss properties than did the alkali metal salts of carboxymethylcellulose for the three base muds. These salts of carboxyethylcellulose also imparted better viscosity properties to the base muds than did the corresponding salts of carboxymethylcellulose in low and high calcium fresh water muds, although the salts of carboxymethylcellulose gave lower viscosities in salt water mud. The gel strengths, initial and ten minute, effected by the addition of these salts of carboxyethylcellulose to the standard muds were, in most cases, as good as those obtained by the addition of corresponding salts of carboxymethylcellulose.

A sample of sodium carboxyethylmannitol was tested in low calcium mud. Because of its ineffectiveness in control of water loss, no additional tests were made on the product.

A sodium salt of carboxyethylcellulose has been prepared that will compare very favorably with sodium carboxymethylcellulose as a drilling mud additive and that appears to have better properties, than sodium carboxymethylcellulose, particularly in regard to reduction in water loss, in high calcium muds.

*Table II.—Sodium carboxyethylcellulose in low calcium EB–10F mud*

| CEC added lbs. per bbl | 0 | 1 | 2 | 3 | 4 |
|---|---|---|---|---|---|
| Viscosity, cps | 17 | 16 | 28.5 | 41.5 | 58.5 |
| Initial gel strength, g | 25 | 0 | 0 | 1 | 2 |
| 10 min. gel strength, g | 35 | 15 | 25 | 30 | 35 |
| Water loss, ml. in 30 min | 29 | 8.5 | 6.5 | 5.4 | 5 |
| Cake thickness, in | 3/64 | 3/64 | 3/64 | 3/64 | 3/64 |
| pH | 8.7 | 8.4 | 8.6 | 8.3 | 8.7 |

*Table III.—Sodium carboxyethylcellulose in high calcium EB–10F mud*

| CEC added, lbs. per bbl | 0 | 1 | 2 | 3 | 4 |
|---|---|---|---|---|---|
| Viscosity, cps | 20 | 14 | 13 | 20 | 30.5 |
| Initial gel strength, g | 30 | 7 | 0 | 0 | 0 |
| 10 min. gel strength, g | 50 | 50 | 10 | 5 | 9 |
| Water loss, ml. in 30 min | 54 | 45.5 | 11.0 | 5.5 | 3.7 |
| Cake thickness, in | 13/64 | 13/64 | 7/64 | 5/64 | 5/64 |
| pH | 6.9 | 7.8 | 7.5 | 7.9 | 8.6 |
| Calcium in filtrate, as $CaCO_3$ P. P. M | 2,100 | | | | |

*Table IV.—Sodium carboxyethylcellulose in salt water EB–10F mud ($Cl^- = 65,200$ P. P. M.)*

| CEC added lbs. per bbl | 0 | 1 | 2 | 3 | 4 |
|---|---|---|---|---|---|
| Viscosity, cps | 28 | 26.5 | 21 | 16 | 22.5 |
| Initial gel strength, g | 50 | 30 | 18 | 0 | 0 |
| 10 min. gel strength, g | 65 | 60 | 45 | 25 | 5 |
| Water loss, ml. in 30 min | 60 | 50 | 36.5 | 15 | 7 |
| Cake thickness, in | 15/64 | 15/64 | 13/64 | 5/64 | 3/64 |
| pH | 7.9 | 8.4 | 8.6 | 8.7 | 9.1 |

*Table V.—Effect of carboxyethylmannitol on low calcium EB–10F mud*

| CEM added, lbs. per bbl | 0 | 1 | 2 | 3 | 4 |
|---|---|---|---|---|---|
| Mud weight, lbs. per gal | 11.2 | | | | |
| Viscosity, cps | 24 | 32 | 36.5 | 46 | 41 |
| Initial gel strength, g | 45 | 67 | 79 | 100 | 72 |
| 10 min. gel strength, g | 57 | 80 | 120 | 135 | 110 |
| Water loss, ml. in 30 min | 23 | 23.5 | 26 | 24.5 | 26.5 |
| Cake thickness, in | 3/64 | 3/64 | 3/64 | 3/64 | 3/64 |
| pH | 9.0 | 8.9 | 9.2 | 9.3 | 9.4 |

*Table VI.—Tests made on 1% solutions of carboxyethylcellulose*

| Sample | Viscosity, cps. @ 68° F. | Insoluble gl.ml./10ml. Sample | pH |
|---|---|---|---|
| Sodium CEC | 11.1 | 0.0 | 9.4 |
| Sodium CMC | 16.5 | 0.0 | 7.2 |
| Sodium Carboxyethylmannitol | | | |

EXAMPLE C

In order to show substantial equivalence of the ammonium, alkali metal and alkaline earth metal salts of carboxyethylcellulose the following drilling mud tests were performed:

Water base well drilling mud evaluation tests were carried out on samples of ammonium, magnesium, calcium and barium derivatives of carboxyethylcellulose. Tests were also run on a sample of acid carboxyethylcellulose and the sample of sodium carboxyethylcellulose from which the above derivatives were prepared.

The samples were tested in a laboratory prepared drilling mud designated as low calcium EB–10–F which had the following composition after dilution; Ezmex (a native West Texas clay) 8.10%, bentonite 0.80%, $BaSO_4$ 26.30%, $BaCO_3$ 0.80% and water 57.00%.

Dosages of the materials tested and a low viscosity grade of sodium carboxymethylcellulose were made so that 0, 1, and 3 pounds of additive were present per barrel of mud. The required amounts of material were hydrated in 50 ml. of water, added to 250 ml. of base mud and stirred for 30 min. on a high speed mixer. The treated mud samples were allowed to stand overnight then stirred again for 30 min. and tested for viscosities, gel strengths and water losses according to the test procedures outlined in A. P. I. Code #29. These results are shown in Table VII.

After the above tests were made the mud samples containing ammonium carboxyethylcellulose, sodium carboxyethylcellulose, acid carboxyethylcellulose, and the sample containing no additive were heated, in sealed containers, at 210° F. for 2 hours, cooled to room temperature and again tested. The results of these tests are shown in Table VIII.

Heating at 210° F. for 2 hours improved the treating properties of both ammonium carboxyethylcellulose and acid carboxyethylcellulose while sodium carboxyethylcellulose was apparently unaffected. This occurs possibly because both ammonium carboxyethylcellulose and acid carboxyethylcellulose may tend to be converted to sodium carboxyethylcellulose at elevated temperatures. The treating effect would then be expected to approach that of sodium carboxyethylcellulose.

Table VIII shows that viscosities, gel strengths, and water losses are reduced when ammonium and acid carboxyethylcellulose treated mud samples are heated.

not subject to injury by salt to any detrimental degree but may still be useful as drilling muds when there is as much in some instances as 238,000 parts per million of sodium chloride in the drilling mud or more. Such muds containing these water soluble salts of carboxyalkylcellulose often have low initial gel strength which allows gas bubbles to come out of the drilling mud so rapidly that the drilling mud will not become gas cut. Elimination of gas cutting reduces the chances of blowouts. Water soluble salts of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium drilling muds are often characterized by very thin filter cake thickness and by very small water loss or complete absence of water loss. This is very useful in avoiding loss of water to the formation, as well as the resultant swelling or caving of the formation which occurs with some formations. They do not generally ferment or spoil. Numerous other advantages of such drilling muds will be apparent from a study of the following representative experiments which have been selected to show in a minimum of space the advantages of water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium drilling muds.

TESTS

The tests of the properties of solutions of these water soluble salts of carboxyalkylcelluloses and/or drilling muds were all made with standard drilling mud laboratory equipment.

The measurements of pH were all made with a Beckman "Industrial Model M" pH meter. The viscosity measurements were all made with a Stormer Viscoscimeter 1931 model made by Arthur H. Thomas Company. The mixing of samples was always for 15 minutes with a Hamilton Beach No. 33 high speed mixer. Sodium chloride content was calculated from a determination of the chlorine ions by titration with silver nitrate using a potassium chromate indicator. The filter cake thickness and water losses were all determined with an "A. P. I. low pressure wall building tester filter press" with a pressure of 100 lbs. per square inch applied for 30 minutes. All temperatures were approximately room temperature. All barrels are 42 U. S. gallon barrels.

EXAMPLE A

Three different laboratory base muds were used in evaluating the samples of carboxyethylcellulose and carboxyethylmannitol, a low calcium, fresh water EB–10F mud, a high calcium, fresh water EB–10F mud, and a high calcium, salt water mud. In each mud there was a 10 to 1 weight ratio of Ezmex clay to bentonite, a total clay content around 12%, and sufficient $BaSO_4$ to weight the muds to around 11–12 pounds per gal. The EB–10 mud was treated with 1% $BaCO_3$ (or phosphates) to give the low calcium mud, it was used unchanged to give the high calcium mud, and it was treated with sodium chloride (50% saturated) to give the salt water mud. Muds varying slightly in composition and treatment were used through this extended investigation. This is shown in the following table.

Table I.—Composition of muds used in investigation

| CEC Sample Tested | Composition of the Mud [1] | | | | | | Mud Weight, #/gal. | Additional Mud Treatment |
|---|---|---|---|---|---|---|---|---|
| | Per cent Total Clay | Per cent $BaCO_3$ | Per cent $BaSO_4$ | Per cent $H_2O$ | P. P. M. Ca as $CaCO_3$ | P. P. M. NaCl as Cl | | |
| LOW CALCIUM MUD | | | | | | | | |
| 15 | 11 | 1 | 30 | 58 | 34 | | 11–12 | 1% $BaCO_3$ or 0.3% $Na_2HPO_4 \cdot 12 H_2O$. |
| HIGH CALCIUM MUD | | | | | | | | |
| 15 | 12 | | 30 | 58 | 2,100 | | 12 | |
| SALT WATER MUD | | | | | | | | |
| 15 | 11 | 1 | 30 | 58 | 1,445 | 65,200 | 11.9 | |

[1] Base muds diluted to 5 parts base mud to 1 part additional water in tests. Dilution due to water solutions of additives. Properties of muds given in later tables are for the diluted muds.

EXAMPLE B

In making the tests on the muds, quantities of the samples of carboxyethylcellulose and carboxymethylmannitol equivalent to 1, 2, 3, and 4 pounds per barrel were dissolved in the laboratory prepared muds. Each treated mud sample was stirred for 30 minutes on a high speed electric mixer and then tested for viscosity, gel strength, water loss, cake thickness and pH. Standard test equipment and procedures as outlined in A. P. I. Code 29 were used.

Table VII.—Comparison of effects of CEC derivatives and sodium carboxymethylcellulose on EB-10-F, low calcium mud

|  | Viscosity, cps. | | | Initial Gel. gms. | | | 10 Min. gel. gms. | | | 30 Min. water loss | | | pH of Filtrate | | |
|---|---|---|---|---|---|---|---|---|---|---|---|---|---|---|---|
| Pounds per barrel | 0 | 1 | 3 | 0 | 1 | 3 | 0 | 1 | 3 | 0 | 1 | 3 | 0 | 1 | 3 |
| Sodium carboxymethylcellulose | 20 | 25 | 65 | 37 | 0 | 0 | 45 | 10.0 | 15.0 | 31.5 | 7 | 4.5 | 9.2 | 8.9 | 9.1 |
| NH₄ CEC | 20 | 25 | 35 | 37 | 25 | 0 | 45 | 50 | 25 | 31.5 | 34 | 7.5 | 9.2 | 9.0 | 8.9 |
| Mg CEC | 20 | ¹9 | ¹10.5 | 37 | 2 | 0 | 45 | 25 | 0 | 31.5 | 28 | 10.5 | 9.2 | 9.0 | 8.3 |
| Ca CEC | 20 | 24.5 | 32 | 37 | 25 | 0 | 45 | 45 | 15 | 31.5 | 32.5 | 7.5 | 9.2 | 8.9 | 8.9 |
| Ba CEC | 20 | 25.5 | 30 | 37 | 20 | 0 | 45 | 30 | 20 | 31.5 | 33 | 8 | 9.2 | 9.0 | 8.9 |
| Na CEC | 20 | 13.5 | 36 | 37 | 0 | 2 | 45 | 5 | 5 | 31.5 | 11 | 5 | 9.2 | 9.0 | 8.9 |
| Acid CEC | 20 | 47 | 75 | 37 | 50 | 40 | 45 | 60 | 190 | 31.5 | 34 | 10 | 9.2 | 8.8 | 8.5 |

¹ Barium sulfate dropped out.

Table VIII.—Effect of heating selected samples at 210° F. for 2 hours

|  | Viscosity, cps. | | | Initial Gel. gms. | | | 10 Min. gel. gms. | | | 30 Min. water loss | | | pH of Filtrate | | |
|---|---|---|---|---|---|---|---|---|---|---|---|---|---|---|---|
| Pounds per barrel | 0 | 1 | 3 | 0 | 1 | 3 | 0 | 1 | 3 | 0 | 1 | 3 | 0 | 1 | 3 |
| NH₄ CEC | 18 | 19 | 39 | 25 | 7 | 1 | 50 | 20 | 10 | 33 | 4 | 7 | 9 | 8.7 | 8.7 |
| Na CEC | 18 | 14 | 42.5 | 25 | 2 | 0 | 50 | 15 | 20 | 33 | 11 | 5 | 9 | 8.5 | 8.5 |
| Acid CEC | 18 | 36 | 69 | 25 | 38 | 5 | 50 | 55 | 40 | 33 | 27.5 | 6 | 9 | 8.9 | 8.5 |

EXAMPLE D

As stated above free acid carboxymethylcellulose and free acid carboxyethylcellulose can be used successfully in drilling mud containing ions of ammonium, or ions of metals, which form water soluble salts of carboxyalkylcellulose. For example, tests on carboxymethylcellulose powder added to a drilling mud of pH 11 containing sodium hydroxide, or on a normal pH mud heated to 95° C., indicate that suitable reductions in viscosity, water loss and gel strengths occur which indicate that sodium carboxymethylcellulose has probably been formed with the result that the water base drilling mud is greatly improved for all drilling purposes.

The commercial use of ammonium carboxymethylcellulose and ammonium carboxyethylcellulose in drilling mud would seem impossible at first thought in view of the alleged instability at 50 to 60° C. of these compounds as mentioned on page 255 of the Brown and Houghton article cited above, but in actual tests it was found that these compounds either were not unstable in a water base drilling mud, or else the alkali metal salts of the same were formed, so that they may be regarded as valuable drilling mud additives even if alkali metal ions replace the ammonium in the compound. Instead of losing treating power at 50 to 60° C. the treating power was sustained after heating to 95° C. for long periods of time.

One gram (dry basis) of the ammonium and free acid carboxymethylcellulose were placed in separate beakers and mixed with 99 grams of water each and allowed to stand overnight. The ammonium carboxymethylcellulose dispersed while the acid carboxymethylcellulose did not disperse. To disperse the acid carboxymethylcellulose, a third aqueous preparation was made in which alkali (NaOH) was added in sufficient amount to maintain the pH of the solution at the thymolphthalein blue end point. When the acid carboxymethylcellulose was dispersed, the solution was neutralized with HCl and made up to 100 ml. The properties of these 1% aqueous solutions are shown in Table IX.

Table IX—Properties of 1% aqueous solutions of CMC

|  | Viscosity, cps. at 20° C. | pH | ml. gel, 10 ml. solution ² |
|---|---|---|---|
| CMC (sodium salt) | 6 | 7.5 | trace. |
| CMC (ammonium salt) | 14.5 | 6.0 | Do. |
| CMC (Free Acid) ¹ | 13 | 8.2 | Do. |
| CMC (Free Acid) | 1 | 3.9 | insoluble. |

¹ CMC dispersed with NaOH.
² Ml. insoluble gel in centrifuge tube after centrifuging for 5 min.

The acid and ammonium CMC were tested in the following mud systems:

(1) KB-5, fresh water, normal pH
(2) EB-10, low calcium, fresh water, normal pH
(3) EB-10, low calcium, fresh water, normal pH, heated 20 hours at 95° C.
(4) EB-10, low calcium, fresh water, high pH
(5) EB-10, low calcium 50% NaCl saturated, high pH In addition, the ammonium CMC was tested in the following systems:

(6) EB-10, high calcium, fresh water, normal pH
(7) EB-10, low calcium, 50% NaCl saturated, normal pH The compositions of the listed fresh water, normal pH muds at the time of testing were as follows:

Table X—Weight per cent composition of muds

| Mud | China Clay | Ez-mex¹ | Bentonite | BaSO₄ | BaCO₃ | H₂O |
|---|---|---|---|---|---|---|
| KB-5 | 14.6 |  | 2.9 | 17.5 |  | 65 |
| EB-10, high calcium |  | 8.8 | 0.9 | 26.3 |  | 64 |
| EB-10, low calcium |  | 8.1 | 0.8 | 26.3 | 0.8 | 64 |

¹ A native Texas clay containing soluble calcium minerals.

The salt water muds were prepared by 50% saturation of the water phase of the mud with sodium chloride, the salt being added after the carboxymethylcellulose derivatives were present in the muds. The high pH muds were obtained by adding 5 ml. of a caustic and quebracho solution (50 pounds each of caustic and quebracho per barrel of solution) to a 300 ml. sample of mud after the additives were present. In a high pH-salt water mud, salt contamination took place after the pH adjustment.

Testing procedures consisted of dispersing or hydrating the carboxymethylcellulose derivatives in 50 ml. of water and after the solutions had stood for several hours the 50 ml. portions were added to 250 ml. of base mud. The mud compositions listed in Table X represent the concentrations of clays in the 250 ml. base mud diluted with 50 ml. of water containing the additives. Dosages of the cellulosic materials equivalent to 0, 1, 2, 3 and 4 pounds material per barrel of mud were added in separate tests. Dosages were based on dry weights of materials. The treated muds, with pH adjustment and salt addition in specified cases, were thoroughly mixed, allowed to stand overnight, restirred for thirty minutes on a high speed mixer and tested in accordance with the procedures outlined in A. P. I. Code 29.

In an elevated temperature experiment in which ammonium carboxymethylcellulose treated muds were heated 20 hours at 95° C., the treated muds were held at 95° C. in vented jars immersed in an oil bath. After the heating period, the muds were cooled to room temperature and standard mud tests made.

The results of these tests, including comparative results using sodium carboxymethylcellulose, are given in the attached Tables XII through XVIII.

The data in the attached Tables XIV through XVIII show a marked similarity between the effects of ammonium carboxymethylcellulose and sodium carboxymethylcellulose on the properties of the various drilling muds tested. The principal difference exists in the slightly higher viscosities and gel strengths existing in the fresh water KB-5 and low calcium EB-10 muds using ammonium carboxymethylcellulose. In the salt water muds and the high calcium EB-10 mud, viscosity and gel strength characteristics are quite similar for the two additives. Water loss results are very nearly the same for both the ammonium carboxymethylcellulose and sodium carboxymethylcellulose in all the mud systems investigated. Temperature is noted to have the same effect on the properties of muds treated with ammonium carboxymethylcellulose and sodium carboxymethylcellulose.

Several additional observations, made on ammonium carboxymethylcellulose during the course of this investigation, were as follows:

(1) No odor of ammonia could be detected from mud samples containing ammonium carboxymethylcellulose, the mud being maintained at a normal pH (around 8 to 9)
(2) Mud samples, containing ammonium carboxymethylcellulose, which were made more alkaline by the addition of caustic and quebracho gave off ammonia
(3) No ammonia odor could be detected from the ammonium carboxymethylcellulose treated mud samples heated at 95° C.

These observations indicate a considerable stability of the ammonium carboxymethylcellulose in muds at normal pH and the loss of ammonia occurring in a mud with a high pH does not impair the treating properties of the additive. Elevated temperature of a mud with a normal pH also does not appear to decompose the ammonium carboxymethylcellulose. This was also confirmed in water solutions by heating a 2% aqueous solution of ammonium carboxymethylcellulose to 95° C. in a vented flask. No ammonia could be detected at the vent with a moist litmus paper. Ammonia was detected around 70° C. when dry ammonium carboxymethylcellulose was heated.

It is of importance to note that the results obtained with ammonium carboxymethylcellulose are not in agreement with results reported previously by Brown and Houghton in their article cited above, even with water solutions.

Acid carboxymethylcellulose was, as expected, insoluble in water and upon addition to a fresh water mud at normal pH (around 8) had no favorable treating properties (Tables XII and XIII). In the KB-5 mud (Table XII), the acid carboxymethylcellulose caused slight increases in viscosities and gel strengths but did not affect the water filtration rate. Aging the mud for 5 days did not change the mud properties except for a lowering of the pH. In the low calcium, EB-10 mud (Table XIII), the acid carboxymethylcellulose caused practically no change in the properties of the base mud.

The results for acid carboxymethylcellulose in Tables XIV and XV are entirely different. In this group of tests in EB-10 mud at high pH ranges, carboxymethylcellulose was as effective as ammonium carboxymethylcellulose or sodium carboxymethylcellulose. The lower pH values for the free acid carboxymethylcellulose samples indicate that part of the sodium ions of the sodium hydroxide used to raise the pH was probably used in converting carboxymethylcellulose to sodium carboxymethylcellulose.

Free acid carboxymethylcellulose was also as effective as sodium carboxymethylcellulose when the mud samples were heated 20 hours in an oil bath at 95° C. at normal pH ranges. These results are shown in Table XVI. The reason for the effectiveness of acid carboxymethylcellulose in these tests is not quite as easy to explain as it was for higher pH values, since no additional ions were added which could have combined with the acid carboxymethylcellulose to have formed a soluble derivative. Apparently the free acid carboxymethylcellulose was converted to a dispersible material of some kind, possibly sodium carboxymethylcellulose. If this is true, the sodium ions were probably obtained from the clay of the mud.

The ammonium salt of carboxymethylcellulose produced almost the same treating effect in various drilling muds as sodium carboxymethylcellulose. No tests were made to determine the stability of ammonium carboxymethylcellulose at temperatures above 95° C. and higher pressures, but it is believed that if it did break down under such conditions it would merely be converted to another soluble derivative and still continue to be as effective as sodium carboxymethylcellulose.

Free acid carboxymethylcellulose was ineffective as a drilling mud additive at pH values below 8.5 at room temperatures. However, at pH values of 11 or temperatures of 95° C., acid carboxymethylcellulose is converted to a soluble derivative which is as effective as sodium carboxymethylcellulose as a drilling mud additive.

| | Viscosity, cps. | | | | | Initial Gel. gm. | | | | | 10 Min. Gel. gm. | | | | | Water loss, ml. in 30 min. at 100 p. s. i. | | | | | pH of Filtrate | | | | |
|---|---|---|---|---|---|---|---|---|---|---|---|---|---|---|---|---|---|---|---|---|---|---|---|---|---|
| Pounds per bbl | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |

TABLE XII.—The Effect of Ammonium and Free Acid CMC on KB-5 Mud

| | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
|---|---|---|---|---|---|---|---|---|---|---|---|---|---|---|---|---|---|---|---|---|---|---|---|---|---|
| CMC (sodium salt) | 22 | 45 | 91 | 100 | >100 | 0 | 0 | 5 | 10 | 10 | 20 | 10 | 40 | 70 | 100 | 13.5 | 6 | 4.2 | 3.6 | 2.6 | 8.6 | 8.4 | 8.7 | 8.5 | 8.5 |
| CMC (ammonium salt) | 22 | 76 | 100 | >100 | >100 | 0 | 5 | 15 | 20 | 50 | 20 | 30 | 150 | 240 | >270 | 13.5 | 5.2 | 4.0 | 2.7 | 2.5 | 8.6 | 8.7 | 8.6 | 8.1 | 8.4 |
| CMC (Free Acid) | 22 | 30.5 | 40 | 43 | 37.5 | 0 | 0 | 5 | 5 | 5 | 20 | 30 | 30 | 30 | 35 | 13.5 | 12.5 | 13. | 13. | 12. | 8.6 | 8.5 | 8.1 | 8.0 | 8.1 |
| CMC (Free Acid) (After 120 hr.) | 22 | 26.5 | 40 | 40 | 39.5 | 0 | 0 | 0 | 0 | 2 | 20 | 10 | 20 | 30 | 20 | 13.5 | 13. | 12.5 | 12.5 | 12.7 | 8.6 | 7.8 | 7.6 | 7.4 | 6.7 |

TABLE XIII.—The Effect of Ammonium and Free Acid CMC on EB-10 Low Calcium, normal pH, Mud

| | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
|---|---|---|---|---|---|---|---|---|---|---|---|---|---|---|---|---|---|---|---|---|---|---|---|---|---|
| CMC (Sodium Salt) | 17 | 17.5 | 32.5 | 40.5 | 55.5 | 25 | 0 | 0 | 0 | 0 | 45 | 5 | 5 | 7 | 5 | 29 | 8 | 4.5 | 3.2 | 3.6 | 9.2 | 9.1 | 9.1 | 9.0 | 0.0 |
| CMC (Ammonium Salt) | 17 | 27 | 45 | 80.5 | >100 | 25 | 0 | 2 | 3 | 3 | 45 | 5 | 10 | 15 | 30 | 29 | 7 | 6 | 4.7 | 4. | 9.2 | 8.7 | 9.1 | 9.5 | 9.2 |
| CMC (Free Acid) | 17 | 18.5 | 22.5 | 22. | 18.5 | 25 | 35 | 38 | 32 | 30 | 45 | 40 | 45 | 60 | 45 | 29 | 31 | 33 | 34 | 38 | 9.2 | 8.7 | 8.4 | 8.4 | 8.4 |

TABLE XIV.—The Effect of Ammonium and Free Acid CMC on EB-10, Low Calcium, High pH, Mud

| | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
|---|---|---|---|---|---|---|---|---|---|---|---|---|---|---|---|---|---|---|---|---|---|---|---|---|---|
| CMC (Sodium Salt) | 4.5 | 17 | 24 | 31.5 | 47.5 | 0 | 0 | 0 | 0 | 1 | 7 | 5 | 5 | 10 | 10 | 22.5 | 6.5 | 4.6 | 3.5 | 3. | 11.5 | 10.9 | 10.5 | 10.8 | 10. |
| CMC (Ammonium Salt) | 4.5 | 20 | 36 | 73 | 103 | 0 | 0 | 0 | 1 | 2 | 7 | 5 | 7 | 15 | 20 | 22.5 | 6.0 | 4.1 | 4.0 | 4.0 | 11.5 | 10.5 | 10.7 | 10.4 | 10.2 |
| CMC (Free Acid) | 4.5 | 20 | 31.5 | 67 | 92. | 0 | 0 | 0 | 0 | 0 | 7 | 5 | 5 | 11 | 15 | 22.5 | 6.5 | 4.0 | 3.5 | 3.8 | 11.5 | 10.5 | 10.0 | 9.9 | 9.7 |

TABLE XV.—The Effect of Ammonium and Free Acid CMC on EB-10 Low Calcium, 166,500 P. P. M. chlorides as NaCl, high pH, Mud

| | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
|---|---|---|---|---|---|---|---|---|---|---|---|---|---|---|---|---|---|---|---|---|---|---|---|---|---|
| CMC (Sodium Salt) | 27 | 31 | 27.5 | 28 | 31 | 30 | 10 | 5 | 0 | 0 | 40 | 70 | 55 | 40 | 9 | 50 | 26.5 | 14.5 | 7. | 4.6 | 10. | 9.7 | 9.7 | 9.4 | 9.3 |
| CMC (Ammonium Salt) | 27 | 31 | 22 | 24 | 29 | 30 | 22 | 0 | 0 | 0 | 40 | 65 | 50 | 25 | 15 | 50 | 31 | 14.5 | 7.4 | 4.8 | 10. | 9.4 | 9.5 | 9.1 | 9.0 |
| CMC (Free Acid) | 27 | 29 | 21.5 | 23.5 | 28.5 | 30 | 15 | 0 | 0 | 0 | 40 | 60 | 65 | 15 | 10 | 50 | 29 | 13 | 6.4 | 4.3 | 10. | 9.3 | 8.9 | 8.9 | 8.9 |

TABLE XVI.—The Effect of Ammonium and Free Acid CMC on EB-10, Low Calcium, normal pH, mud. Heated 95° C. for 20 hrs.

| | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
|---|---|---|---|---|---|---|---|---|---|---|---|---|---|---|---|---|---|---|---|---|---|---|---|---|---|
| CMC (Sodium Salt) | 14 | 22.5 | 42.5 | 52. | 101.5 | 16 | 0 | 0 | 1 | 1 | 35 | 10 | 15 | 20 | 25 | 42 | 13.7 | 5.5 | 4.8 | 4. | 8.8 | 8.6 | 8.6 | 8.4 | 8.4 |
| CMC (Ammonium Salt) | 14 | 22.5 | 43 | 70 | 100 | 16 | 0 | 1 | 0 | 2 | 35 | 10 | 10 | 15 | 25 | 42 | 8.7 | 6.3 | 4.8 | 4.6 | 8.8 | 8.5 | 8.9 | 8.8 | 8.7 |
| CMC (Free Acid) | 14 | 20 | 35 | 55 | 80.5 | 16 | 0 | 0 | 0 | 0 | 35 | 10 | 10 | 10 | 20 | 42 | 9.5 | 5.8 | 4.9 | 4.3 | 8.8 | 8.5 | 8.5 | 8.6 | 8.7 |

TABLE XVII.—The Effect of Ammonium CMC on EB-10, High Calcium, normal pH, Mud. Calcium 1710 P. P. M. as CaCO₃

| | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
|---|---|---|---|---|---|---|---|---|---|---|---|---|---|---|---|---|---|---|---|---|---|---|---|---|---|
| CMC (Sodium Salt) | 13 | 11.5 | 9.5 | 20 | 27 | 22 | 1 | 0 | 0 | 0 | 35 | 35 | 2 | 0 | 0 | 58 | 45 | 14 | 5.5 | 3. | 8.1 | 8.1 | 8.1 | 8.1 | 8.1 |
| CMC (Ammonium Salt) | 13 | 11. | 10 | 27 | 34 | 22 | 1 | 0 | 0 | 0 | 35 | 30 | 2 | 5 | 6 | 58 | 52 | 14 | 5.2 | 3.4 | 8.1 | 8.0 | 8.1 | 7.9 | 8.0 |

TABLE XVIII.—The Effect of Ammonium CMC on EB-10 158,000 P. P. M. chlorides as NaCl, normal pH, Mud

| | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
|---|---|---|---|---|---|---|---|---|---|---|---|---|---|---|---|---|---|---|---|---|---|---|---|---|---|
| CMC (Sodium Salt) | 14.5 | 11.5 | 14 | 11.5 | 13 | 22 | 7 | 5 | 0 | 0 | 30 | 20 | 40 | 5 | 2 | 62 | 71.5 | 54 | 28.5 | 12 | 8.2 | 7.5 | 6.1 | 6.5 | 6.9 |
| CMC (Ammonium Salt) | 14.5 | 12.5 | 14.5 | 11.5 | 11 | 22 | 8 | 4 | 0 | 0 | 30 | 30 | 45 | 6 | 2 | 62 | 75. | 58.5 | 30 | 10 | 8.2 | 7.5 | 6.0 | 6.8 | 6.8 |

EXAMPLE E

The following advantages of drilling mud containing water soluble salts of carboxyalkylcelluloses will be found to be true, as evidenced by extensive field testing of sodium carboxymethylcellulose in oil wells:

(1) Such drilling mud is made resistant as to change in important qualities, such as viscosity, gel strength and low water loss, to salt or anhydrite formations.

(2) Excellent logs can be obtained of all types of electrical bore hole tests, such as the "Electrolog" (a trade name) when the hole is full of such drilling mud.

(3) Large savings in weighting agents (in the South Tyler field where a 14 lb. mud is needed from 7,000 to 10,000 feet some 5,000 sacks of 100 lbs. each of barium sulfate was saved in drilling a well which was otherwise the same as another well using ordinary mud).

(4) Large savings in treating agents.

(5) When using such muds generally any intermediate strings of casings to protect the well from rock salt or bentonitic shale are unnecessary, and their cost can be saved.

(6). The filter cake of such muds is thin, strong, impervious and has low water loss compared to ordinary mud.

(7) These water soluble salts of carboxyalkylcellulose last longer in the drilling mud pit and well bore than most other known organic additives, withstanding chemical and bacterial action and retaining their valuable treating properties.

(8) Because the sides of the hole do not tend to dissolve or cave with such mud hole enlargement during and after drilling is kept at a minimum. Many advantages result. A broken drill string cannot get under a ledge in case of a twist off. The amount of cement used is reduced in cementing around a casing, and the cement tends to go around the entire casing, and not channel by at one point. Actual caliper logs on two wells in the same formation show marked reduction in size and greater uniformity of hole diameter in the well in which such muds were used over the well in which ordinary mud was used.

EXAMPLE F

The following filtration tests may be made:

Table XIX

| Compound | Amount of Filtrate |
| --- | --- |
| (A) 1% CMC (ammonium salt) in water. | Over 300 ml. in 40 seconds. |
| (B) 1% CEC (sodium salt) in water. | Do. |
| (C) 15% clay in water | 46 ml. in 30 minutes. |
| (D) A+C in water | 8 ml. in 30 minutes. |
| (E) B+C in water | 10 ml. in 30 minutes. |

A pressure of 100 lbs. per square inch and a standard filter paper is used in these tests.

EXAMPLE G

Samples of starch containing drilling mud and samples of drilling mud containing water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium are left to stand for 6 months. Some of each are contaminated with sour mud (fermented starch mud) others merely exposed to the air.

The starch containing muds will all ferment and go sour, becoming flocculated or otherwise worthless as drilling mud in a period of some days, the contaminated ones fermenting almost at once, the uncontaminated ones fermenting several days later. None of the water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium containing muds will ferment, even after six months regardless of contamination and exposure to the air. It is possible some organism could attack them successfully, but they are much more resistant than starch containing muds.

EXAMPLE H

A solution of 4 pounds to the barrel of water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium in water is mixed with greater than the usual maximum proportions of caustic soda, phosphates (commercially sold as "Calgon") and/or quebracho as used in starch drilling mud and no chemical changes are observed. The tests are made with both one and two chemicals added to the solution.

The above simple experiments are merely representative and are given to show how water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium may be used in water base drilling muds by those skilled in the art of water base drilling muds.

The alkaline earth metals are enumerated differently in different periodic tables, but in drilling mud the grouping in J. W. Mellor's "Modern Inorganic Chemistry" (1939), Longmans Green & Co., publishers, (revised and edited by G. D. Parkes), page 118 (which lists as alkali metals (group IA) lithium, sodium and potassium and as alkaline earth metals (group IIA) magnesium, calcium, strontium and barium) is considered best and is relied on in this invention. Beryllium is excluded because beryllium nitrate in a basic solution containing sodium carboxyethylcellulose causes precipitation of the carboxyethylcellulose which indicates beryllium carboxyethylcellulose to be inferior.

It is to be understood that while a theory of operation has been advanced, it is not the only or necessary one, but has only been advanced to facilitate the disclosure. It is understood, however, that this invention is not limited to any theory of operation or action. It is further obvious that various changes may be made in the details without departing from the spirit of this invention, nor from the scope of the invention as defined in the following claims. It is to be understood the invention is not to be limited to the specific details described. For example calcium salts may form a white haze of colloidal nature in the solution and the solution will still be substantially a water soluble alkali metal carboxymethylcellulose. For example the tests with treating and control agents under Example H indicate that water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium are somewhat inert chemically and that all the treating, weighting and control agents of the well drilling fluid and well controlling fluid arts may, after a simple test for lack of obvious adverse reaction, be employed without invention in my water soluble salt of a carboxyalkylcellulose selected from the group consisting of ammonium carboxymethylcellulose, alkali metal carboxyethylcellulose, alkaline earth metal carboxyethylcellulose, and ammonium carboxyethylcellulose wherein the important alkali metals are lithium, sodium and potassium and the important alkaline earth metals are magnesium, calcium, strontium and barium drilling and controlling fluids, and that with few, if any, exceptions they will be so employable. My invention is therefore to be defined by the following claims.

Having described my invention, I claim:

1. In a process of drilling wells comprising the steps of drilling the well with well drilling tools, and circulating through the well during said drilling a water base drilling mud which forms a filter cake on the wall of the well, the improvement comprising incorporating in said drilling mud a free acid carboxyalkylcellulose in an amount sufficient to be converted into sufficient water soluble carboxyalkylcellulose to reduce the water loss due to filtration through said filter cake but insufficient to increase the viscosity of said drilling mud to such an extent that it cannot be circulated.

2. The process of claim 1 in which the carboxyalkylcellulose is carboxymethylcellulose.

3. In a process of drilling wells comprising the steps of drilling the well with well drilling tools, and circulating through the well during said drilling a water base drilling mud of a pH greater than 10 which forms a filter cake on the wall of the well, the improvement comprising incorporating in said drilling mud a free acid carboxyalkylcellulose in an amount sufficient to be converted into sufficient water soluble carboxyalkylcellulose to reduce the water loss due to filtration through said filter cake but insufficient to increase the viscosity of said drilling mud to such an extent that it cannot be circulated.

4. The process of claim 3 in which the carboxyalkylcellulose is carboxymethylcellulose.

5. A water base well drilling mud comprising in combination with sufficient water to maintain the mud as a fluid, sufficient clayey material to form a filter cake on the wall of the well, and a water soluble salt of a carboxyalkylcellulose selected from the group consisting of ammonium carboxymethylcellulose, ammonium carboxyethylcellulose, sodium carboxyethylcellulose, potassium carboxyethylcellulose, lithium carboxyethylcellulose, calcium carboxyethylcellulose, strontium carboxyethylcellulose, barium carboxyethylcellulose, and magnesium carboxyethylcellulose in an amount sufficient to reduce the water loss due to filtration through said filter cake without increasing the viscosity of said well drilling mud to such an extent that it cannot be circulated.

6. A water base well drilling mud comprising in combination sufficient water to maintain the mud as a fluid, sufficient clayey material to form a filter cake on the wall of the well, and a water soluble ammonium carboxymethylcellulose in an amount sufficient to reduce the water loss due to filtration through said filter cake without increasing the viscosity of said well drilling mud to such an extent that it cannot be circulated.

7. A water base well drilling mud comprising in combination sufficient water to maintain the mud as a fluid, sufficient clayey material to form a filter cake on the wall of the well, and a water soluble sodium carboxyethylcellulose in an amount sufficient to reduce the water loss due to filtration through said filter cake without increasing the viscosity of said well drilling mud to such an extent that it cannot be circulated.

8. A water base well drilling mud comprising in combination sufficient water to maintain the mud as a fluid, sufficient clayey material to form a filter cake on the wall of the well, and a water soluble alkali metal carboxyethylcellulose in an amount sufficient to reduce the water loss due to filtration through said filter cake without increasing the viscosity of said well drilling mud to such an extent that it cannot be circulated.

9. A water base well drilling mud comprising an aqueous fluid mixture containing suspended solids which form a filter cake on the wall of the well, and a water soluble salt of a carboxyalkylcellulose selected from the group consisting of ammonium carboxymethylcellulose, ammonium carboxyethylcellulose, sodium carboxyethylcellulose, potassium carboxyethylcellulose, lithium carboxyethylcellulose, calicum carboxyethylcellulose, strontium carboxyethylcellulose, barium carboxyethylcellulose, and magnesium carboxyethylcellulose in an amount sufficient to reduce the water loss due to filtration through said filter cake without increasing the viscosity of said well drilling mud to such an extent that it cannot be circulated.

10. A water base well drilling mud comprising an aqueous fluid mixture containing suspended solids which form a filter cake on the wall of the well, and a water soluble ammonium carboxymethylcellulose in an amount sufficient to reduce the water loss due to filtration through said filter cake without increasing the viscosity of said well drilling mud to such an extent that it cannot be circulated.

11. A water base well drilling mud comprising an aqueous fluid mixture containing suspended solids which form a filter cake on the wall of the well, and a water soluble sodium carboxyethylcellulose in an amount sufficient to reduced the water loss due to filtration through said filter cake without increasing the viscosity of said well drilling mud to such an extent that it cannot be circulated.

12. A water base well drilling mud comprising an aqueous fluid mixture containing suspended solids which form a filter cake on the wall of the well, and a water soluble alkali metal carboxyethylcellulose in an amount sufficient to reduce the water loss due to filtration through said filter cake without increasing the viscosity of said well drilling mud to such an extent that it cannot be circulated.

13. A water base well drilling mud comprising in combination sufficient water to maintain the mud as a fluid, sufficient clayey material to form a filter cake on the wall of the well, and a water soluble ammonium carboxyethylcellulose in an amount sufficient to reduce the water loss due to filtration through said filter cake without increasing the viscosity of said well drilling mud to such an extent that it cannot be circulated.

14. A water base well drilling mud comprising in combination sufficient water to maintain the mud as a fluid, sufficient clayey material to form a filter cake on the wall of the well, and a water soluble potassium carboxyethylcellulose in an amount sufficient to reduce the water loss due to filtration through said filter cake without increasing the viscosity of said well drilling mud to such an extent that it cannot be circulated.

15. A water base well drilling mud comprising in combination sufficient water to maintain the mud as a fluid, sufficient clayey material to form a filter cake on the wall of the well, and a water soluble calcium carboxyethylcellulose in an amount sufficient to reduce the water loss due to filtration through said filter cake without increasing the viscosity of said well drilling mud to such an extent that it cannot be circulated.

16. A water base well drilling mud comprising an aqueous fluid mixture containing suspended solids which form a filter cake on the wall of the well, and a water soluble ammonium carboxyethylcellulose in an amount sufficient to reduce the water loss due to filtration through said filter cake without increasing the viscosity of said well drilling mud to such an extent that it cannot be circulated.

17. A water base well drilling mud comprising an aqueous fluid mixture containing suspended solids which form a filter cake on the wall of the well, and a water soluble potassium carboxyethylcellulose in an amount sufficient to reduce the water loss due to filtration through said filter cake without increasing the viscosity of said well drilling mud to such an extent that it cannot be circulated.

18. A water base well drilling mud comprising an aqueous fluid mixture containing suspended solids which form a filter cake on the wall of the well, and a water soluble calcium carboxyethylcellulose in an amount sufficient to reduce the water loss due to filtration through said filter cake without increasing the viscosity of said well drilling mud to such an extent that it cannot be circulated.

CARY R. WAGNER.

REFERENCES CITED

The following references are of record in the file of this patent:

UNITED STATES PATENTS

| Number | Name | Date |
|---|---|---|
| 2,425,768 | Wagner | Aug. 19, 1947 |